July 24, 1962 E. A. SEIZ 3,045,834
RACK CONSTRUCTION
Original Filed July 25, 1957 5 Sheets-Sheet 1

INVENTOR
EDWARD A. SEIZ
BY
ATTORNEYS

July 24, 1962
E. A. SEIZ
3,045,834
RACK CONSTRUCTION
Original Filed July 25, 1957
5 Sheets-Sheet 2
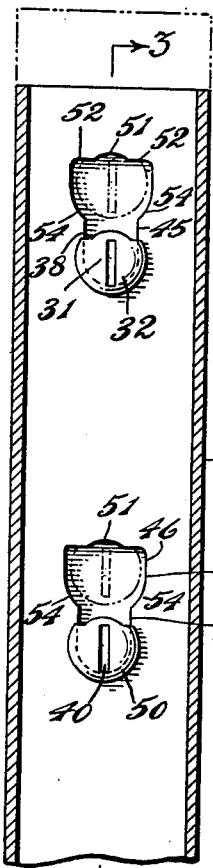
Fig. 2.
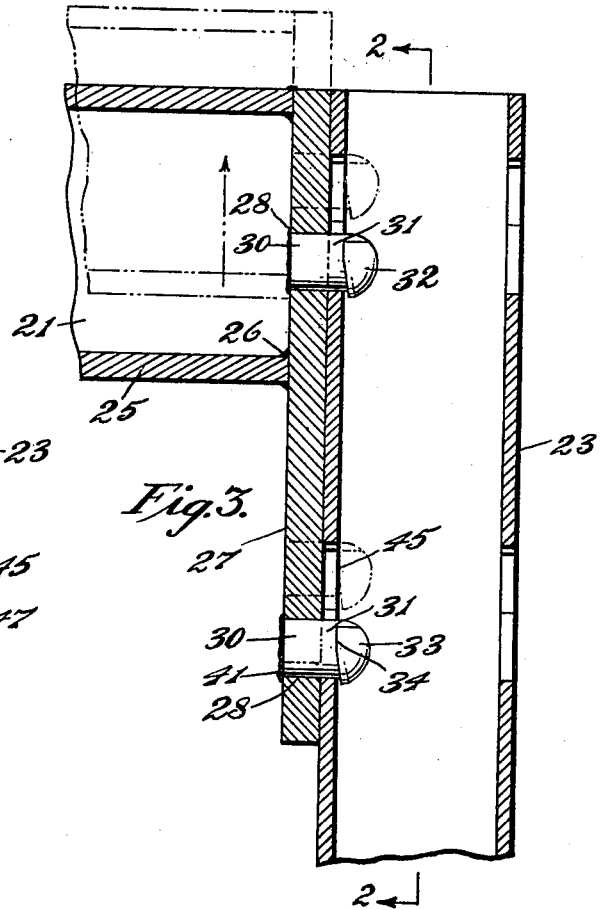
Fig. 3.
Fig. 11.
INVENTOR
EDWARD A. SEIZ
BY
ATTORNEYS July 24, 1962

E. A. SEIZ 3,045,834

RACK CONSTRUCTION

Original Filed July 25, 1957

INVENTOR
EDWARD A. SEIZ
BY
ATTORNEYS

July 24, 1962    E. A. SEIZ    3,045,834
RACK CONSTRUCTION
Original Filed July 25, 1957    5 Sheets-Sheet 4
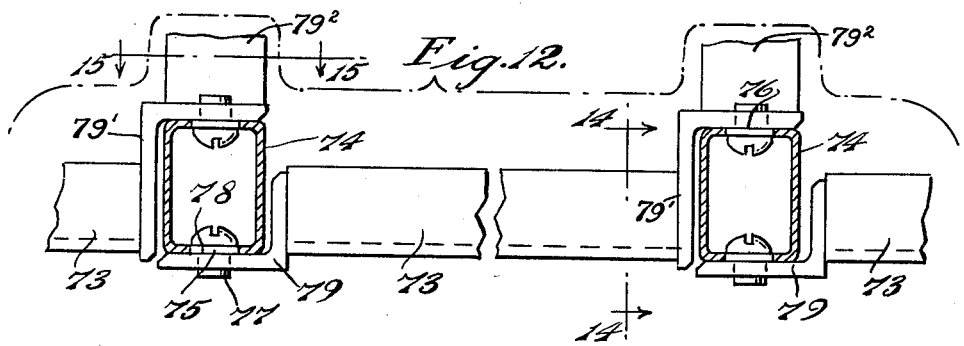
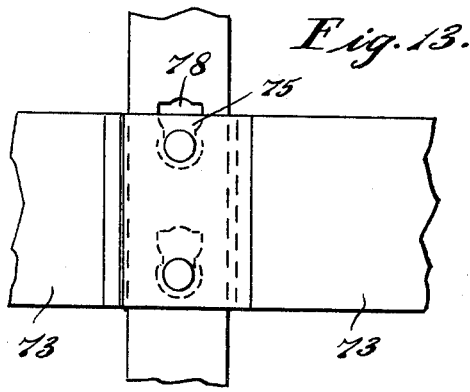
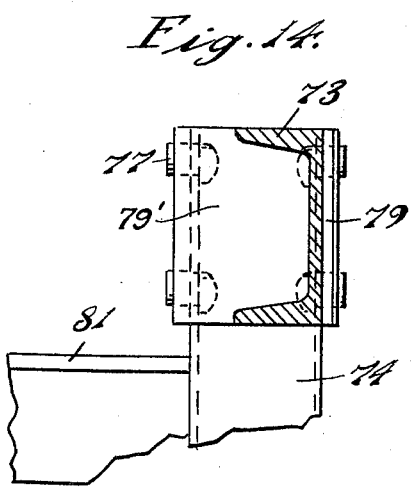
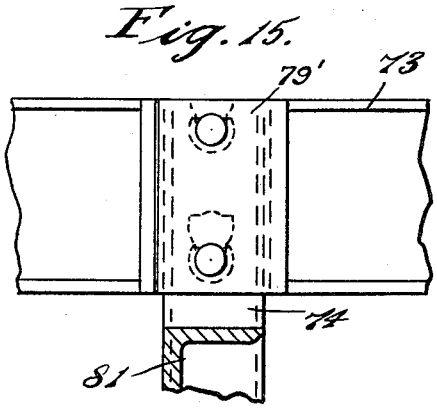
INVENTOR
EDWARD A. SEIZ
BY
ATTORNEYS July 24, 1962  E. A. SEIZ  3,045,834
RACK CONSTRUCTION
Original Filed July 25, 1957  5 Sheets-Sheet 5
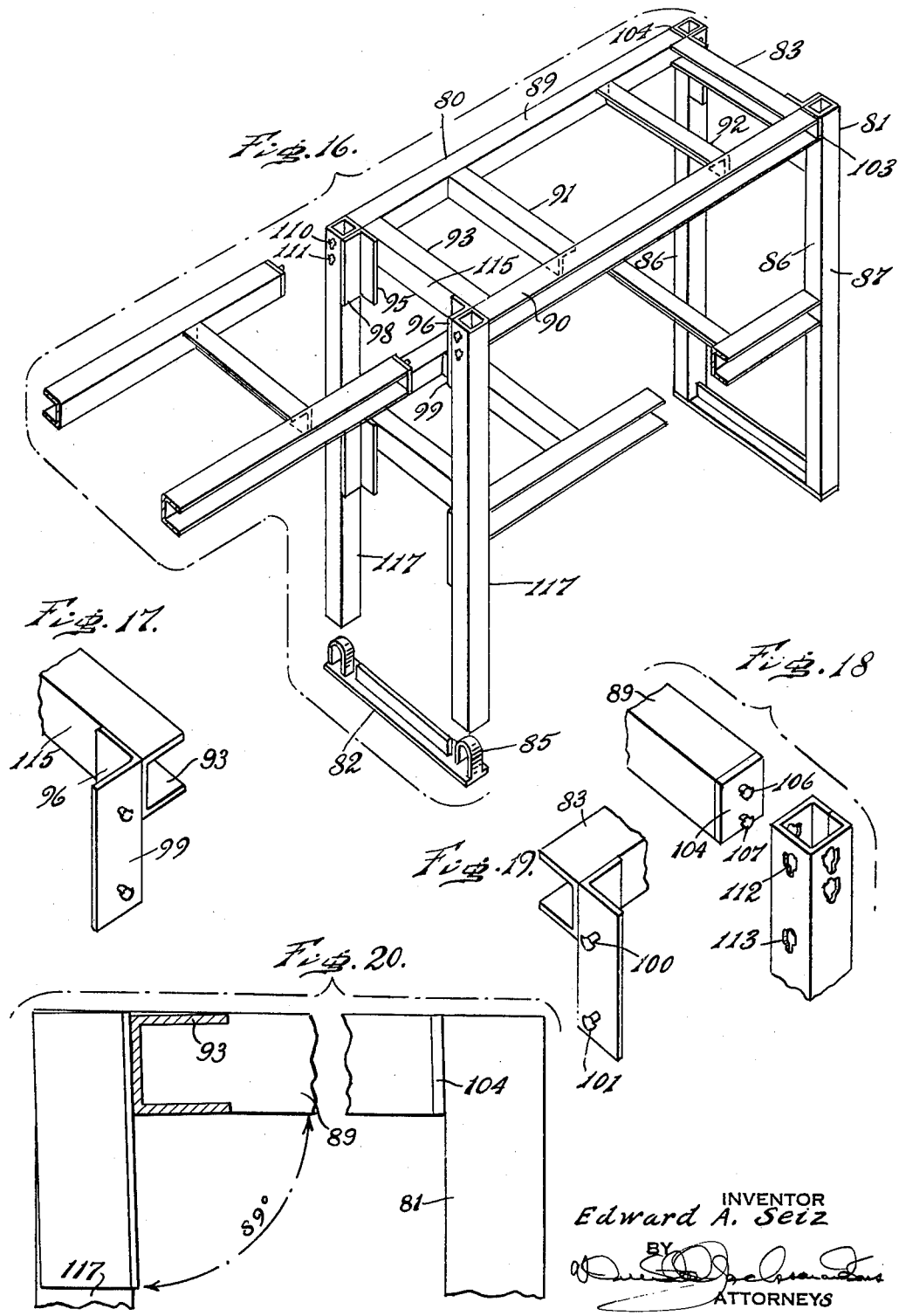
INVENTOR
Edward A. Seiz United States Patent Office 3,045,834
Patented July 24, 1962

3,045,834
RACK CONSTRUCTION
Edward A. Seiz, 136 E. 3rd St., Lansdale, Pa.
Original application July 25, 1957, Ser. No. 674,135, now Patent No. 2,999,570, dated Sept. 12, 1961. Divided and this application Aug. 18, 1960, Ser. No. 50,531
4 Claims. (Cl. 211—148)

The present invention relates to a rack construction.

The present application is a divisional of my copending application, Serial No. 674,135, filed July 25, 1957 for Interlock and Method of Making, now United States Patent No. 2,999,570, granted September 12, 1961.

A purpose of my invention is to construct a rack with good stability, excellent economy and great ease of erection.

A further purpose of the invention is to facilitate the removal of interlock lugs from interlock recesses by guiding the lugs on the tops of the recesses.

A further purpose is to accurately position interlock lugs angularly with respect to their axis at the time they are assembled.

A further purpose is to accurately locate the heads of interlock lugs with respect to the members supporting the same so as to assure firm locking to the structure having the interlock recess.

A further purpose is to stagger the interconnection with the uprights on opposite sides of the columns so as to permit easy disassembly or removal of intermediate connecting elements.

Further purposes appear in the specification and in the claims.

In the drawings I have chosen to illustrate only a few of the numerous embodiments in which my invention may appear, selecting the forms shown from the standpoints of convenience in illustration, satisfactory operation, and clear demonstration of the principles involved.

FIGURE 1 is a fragmentary section through one of the interlocks, the section being taken on the line 2—2 of FIGURE 3.

FIGURE 3 is a fragmentary section on the line 3—3 of FIGURE 2 illustrating the interlock of FIGURE 2, with phantom showing of the interlocks in position for removal or separation.

FIGURE 11 is a fragmentary exploded perspective showing the interlock in position for application adjacent the top of a column.

FIGURE 11 is a plan section showing an alternate embodiment of the invention.

FIGURE 13 is a fragmentary elevation of one of the columns and longitudinal connecting elements of FIGURE 12.

FIGURE 14 is a fragmentary section on the line 14—14 of FIGURE 12.

FIGURE 15 is a fragmentary section on the line 15—15 of FIGURE 12.

FIGURE 16 is a partially exploded perspective view of an alternate form of the rack structure.

FIGURE 17 is a fragmentary perspective of the end of a cross member of the rack of FIGURE 16, showing the angle bearing the interlock lugs.

FIGURE 18 is an exploded perspective view showing the end connection between the column and the horizontal element at the end of the bed plate free of the cross member.

FIGURE 19 is a fragmentary perspective of the structure starter of the rack structure of FIGURE 16.

FIGURE 20 is a side elevation of the column connection illustrating the acute angle formed prior to loading.

Figure 1:
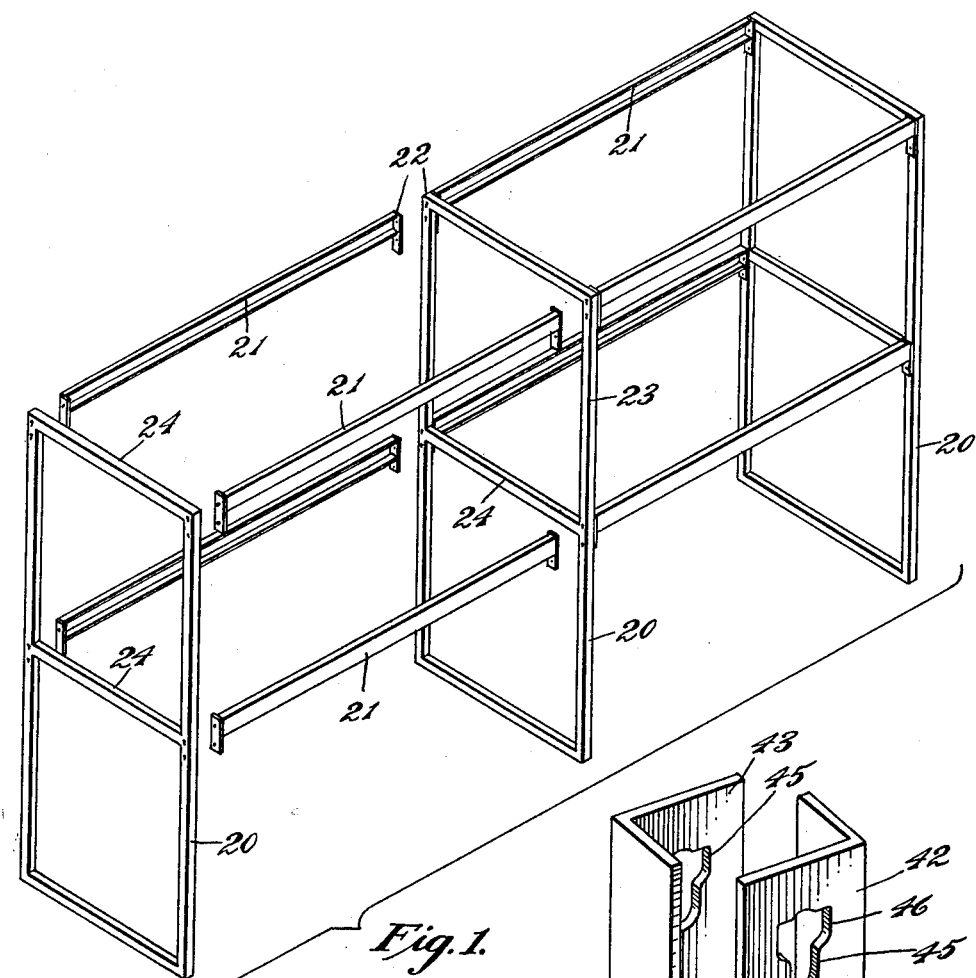
FIGURE 1 is an exploded perspective of a warehouse rack employing the structure of the invention.

Describing in illustration but not in limitation and referring to the drawings.

In the prior art, in assembly of structures such as storage racks, frames, and the like, it has been common practice to bolt the horizontal members to the uprights or columns by bolts extending horizontally.

The present invention is intended to provide a more reliable, convenient and inexpensive interlock connection between structural elements, one of which may suitably be a vertical member such as an upright or column, and another a horizontal member.

The interlock of the invention provides a tight joint due to the action of the taper on the interlock lugs which engages the walls of interlock recesses suitably provided on the vertical member or column.

Heretofore it has been often tedious to assemble and disassemble interlock elements because of the tendency of the heads on the interlock lugs to catch and prevent the desired movement. One of the important features of the invention is that the top of the interlock lugs and the top of the interlock recesses have been formed so that the recesses guide the lugs in axial motion. This is desirably accomplished by providing a curved surface in prolongation of the diameter of the interlock lug at the center of the top of the lug and a correspondingly shaped recess at the center of the top of the interlock recess, with flaring suitably flat portions on opposite sides of the lug head and the recess at the top to prevent canting of the lug on its axis.

The lug heads at the downwardly directed ends are suitably tapered so as to grip against the walls of the interlock recesses when they move down in interlock slots.

In order to assure that the lugs are properly positioned with respect to the angular relationship around the lug axis, slots are provided in the lug heads and the slots are suitably engaged by projections in a welding fixture which determines and secures the angular position of the lugs. Furthermore the distance of the interlocked heads beyond the supporting element is determined accurately by a gauge plate which is located under the lug heads during welding.

Jack mechanism is desirably provided to remove the gauge plate.

In some cases I stagger the interconnections of the beams to the columns so as to permit removal of a beam easily without interference with adjoining structure.

Considering now the drawings in detail, FIGURE 1 illustrates a storage rack for a warehouse or the like suitably consisting of upright frames 20 which are joined to longitudinal horizontal beams 21 by interlock connections 22 which, as shown, are provided between the ends of the horizontal beams and suitable vertical columns 23 of the uprights. The uprights also have horizontal members 24 joining the columns from front to back.

Each of the horizontal beams 21 desirably comprises a channel 25 which is joined as by welding at 26 to an end plate 27 which extends vertically. The end plate has suitably vertically spaced lug openings 28 desirably extending horizontally and receiving the shank portions 30 of interlock lugs 31.

The interlock lugs are sufficiently spaced from one another so as to give moment support to the columns.

Figures 6, 7, 10:
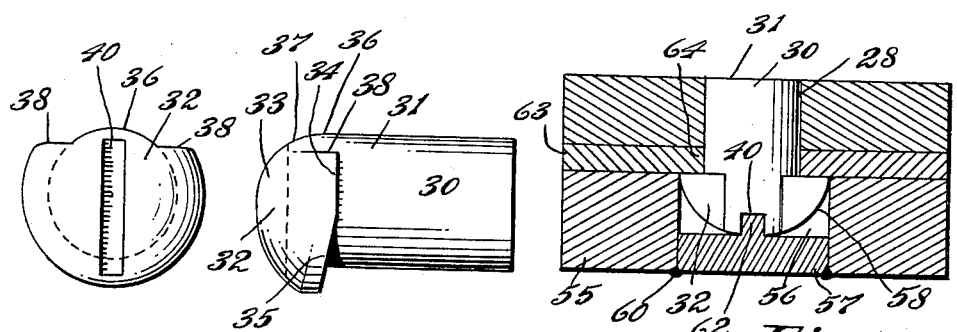
FIGURE 6 is an enlarged end elevation of an interlock lug according to the invention.
FIGURE 7 is a side elevation of the interlock lug of FIGURE 6.
FIGURE 10 is an enlarged section of FIGURE 9 on the line 10—10.

The interlock lugs have at the end, beyond the end plate, heads 32 which are suitably generally hemispherical having curved surfaces 33, with flat portions 34 under the heads at the sides, and portions 35 under the heads at the bottom which taper from the bottom portion of the head to a position near the midline as best seen in FIGURE 7.

At the top the radius of the circular shank 30 is continued at 36 out through the head, filleting somewhat at 37 to merge the circular contour 36 into the spherical curve of the head. The head on either side of the prolonged circular portion 36 extends straight laterally at 38.

In line with the diameter and suitably extending vertically downwardly, the head has a slot 40 which is used in locating the angular position of the interlock lug for the purposes of welding as later explained.

The shank 30 of the interlock lug is desirably welded at 41 at the back to secure it to the end plate, this welding desirably being completed as later explained before the end plate is secured to the horizontal channel 25.

Figure 4:
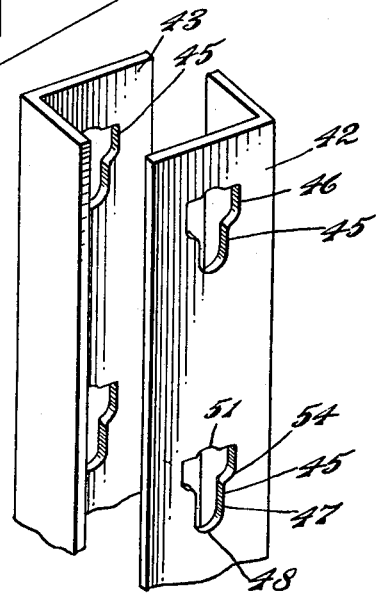
FIGURE 4 is an exploded perspective of one of the columns prior to welding.
Figure 5:
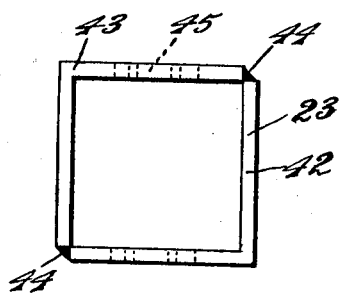
FIGURE 5 is a top plan view illustrating one of the columns after welding.

As shown in FIGURES 3 and 4, the column preferably consists of two angles 42 and 43 welded together along their vertical meeting corners 44 to form a suitably rectangular or square section.

The columns have interlock openings 45 in position to receive the interlock lugs.

The interlock recesses comprise relatively wide portions 46 at the top which are large enough to pass the entire lug heads, and relatively narrow slots 47 extended down therefrom and ending in curved bottoms 48. The slots 47 are just wide enough to pass the shank portions 30 of the interlock lugs, but are not wide enough to pass the laterally projecting head portions tapering at 35 nor the flat head portions 34. Thus as seen in FIGURE 2 there is an appreciable extension 50 of the head portion beyond the slot 47 so as to hold the interlock in place.

The top of the recess 45 has an upwardly curving portion 51 which suitably conforms to the curvature of the circular shank on the interlock lug so as to receive and guide the top of the shank prolongation portion 36 in inserting and removing the interlock lugs from the recesses. On either side of the portion 51 there are straight top portions 52 of the recess which engage and guide the flat portions 38 at the top of the interlock lug head as best seen in FIGURE 6.

In some cases where the top of the interlock recess is at the top of the column, a special interlock recess 53 is provided which omits entirely the top portion at 51 and 52 so that the interlock lug can be raised up above the groove portion 47 to remove the top interlock lug. Curved guiding edges 54 of the recess, which correspond to guiding edges 54 provided on recesses located at lower positions on the columns, are retained to guide the shank into the groove 47 when the interlock is fastened.

Figure 8:
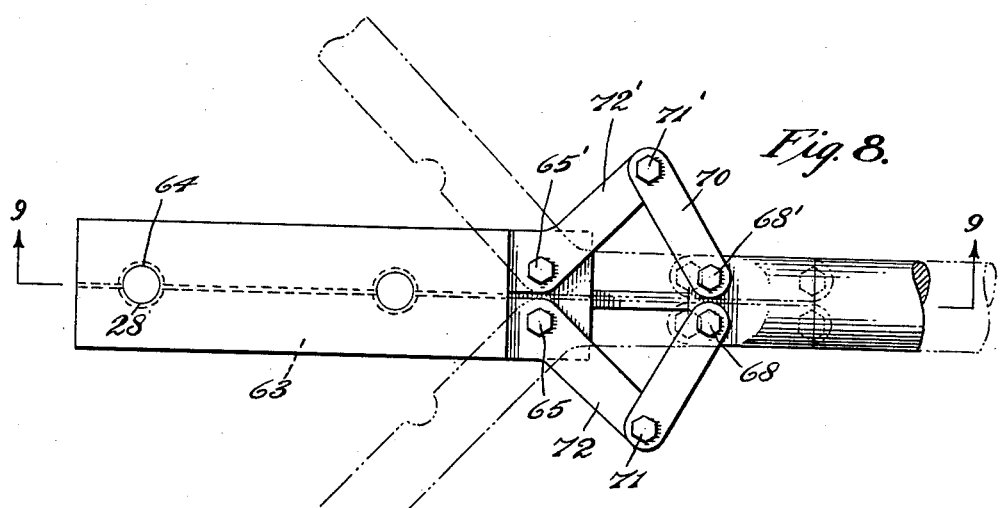
FIGURE 8 is a fragmentary plan view illustrating the assembly of the interlock lugs and their support for welding, the view showing the jack in retracted position illustrated by dot and dash lines.
Figure 9:
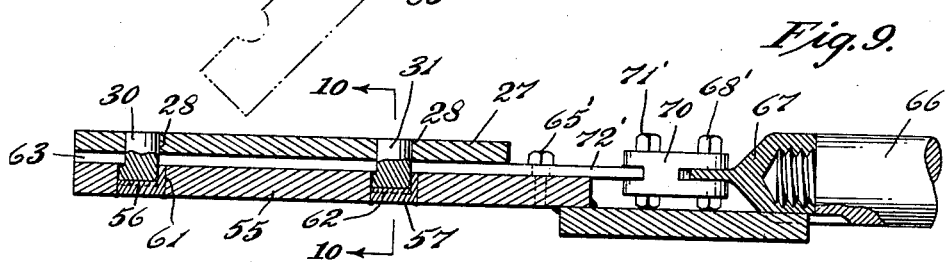
FIGURE 9 is a section of FIGURE 8 on the line 9—9.

A fixture as shown in FIGURES 8 and 9 is provided to assist in welding the interlock lugs in the proper position. The fixture consists of a socket plate 55 which has sockets 56 formed by securing plugs 57 into the bottom of openings 58 by welds 60. The plugs have guiding extensions 61 which conform to the shape of the head of the lug, and also projections 62 which extend longitudinally in the direction to fit into the grooves 40, engaging in the grooves and assuring that the interlock lugs are accurately positioned angularly.

The interlock lugs, head down, are placed in the sockets in the socket plate, and then opposed gauge plates 63 having semicircular openings 64 to surround the shanks of the lugs are brought in from the two sides to engage and position end plate 27 on the shanks of the interlock lugs. Then an end plate 27 having interlock lug openings 28 is placed on top of the gauge plates, exposing the ends of the shanks of the lugs at the top where the weld 41 can readily be completed, the thickness of the gauge plates determining the distance between the underside of the head and the end plate which supports the interlock lugs.

The gauge plates are suitably pivoted, scissors fashion, at 65 and 65' respectively on the socket plate 55. To remove the gauge plates after the completion of welding, jack action is applied by a jack having a ram 66 threaded into a ram head 67 which pivotally connects at 68 and 68' with links 70 which pivotally connect at 71 and 71' with bell crank extensions 72 and 72' on the gauge plates.

In operation, in making up one of the structural members, the interlock lugs are inserted in the sockets of the socket plate as shown in FIGURES 8, 9 and 10, with the slots 40 engaging the projections 62 of the lugs, so as to align the lugs longitudinally. Then the two gauge plates are brought together around the shanks of the interlock lugs, the particular thickness of gauge plate being selected which is proper for the particular thickness of metal of the column to be used. Then the end plate is inserted on top of the gauge plates, the holes in the end plate receiving the shanks of the lugs, after which the lugs are welded at the top in FIGURE 9, forming the welds 41 which join the lugs to the end plates. Then the jack is moved forward so as to spread the gauge plates, after which the end plate is removed from the socket plate and is welded on the end of one of the horizontal channel elements of the beam.

The recesses and slots are made in opposite sides of the columns, and the structure is fabricated complete as shown in FIGURE 1. It is then ready to be assembled by simply inserting the lugs in the dot-and-dash position of FIGURE 3 and then forcing the lugs down in the slots 47. As the lugs move down the wedge faces 35 permit the lugs to grip tightly on the walls of the column adjoining the slots, and at the same time guide the lugs into position by engaging the edges 54 of the recesses.

When it is desired to withdraw the interlock, the horizontal beam including the end plate is raised, bringing the curved portions 36 of the tops of the shanks into the curved portions 51 of the recesses, thus aligning the lugs. The lugs are then withdrawn axially and this can be done readily without danger of unintended engagement with the slots.

In some cases as shown in FIGURES 12 to 15, there is a special advantage in removing a beam or other structural element united by a quick detachable connection to a column or related element readily even though there may be limited space or it may not be desired to disassemble the entire structure.

This is shown in the modified form of FIGURES 12 to 15, where the beam-like elements 73 are connected to the columns 74 by quick detachable connections 75 on one side of one beam and quick detachable connections 76 on the other side of the next beam. The connections themselves may be as already described, comprising male elements 77 which extend into female slots 78 in the columns. The male elements in this embodiment are mounted on angles 79 and $79^1$ secured as by welding to the respective ends of the beams.

The columns are suitably connected by transverse beams $79^2$ which are desirably united to the columns by quick detachable connections as already described.

In operation it will be evident that one of the beams 73 can be detached by raising it with respect to the column 74 so as to release the male elements from the slots. The quick detachable connection 75 is then separated by rotating the beam 73 counterclockwise in FIGURE 12 and the same is true of the quick detachable connection 76.

The connection of the beam to the columns is accomplished in the reverse manner.

In my alternate and preferred form of rack structure, shown in FIGURES 16 to 20, the same type of interlock openings and lugs is used with different rack structure.

Basically the rack structure consists of bed members 80, and columns 81 with there being also preferably foot members 82 upon which the columns rest and at one end of the structure starters 83.

Foot members 82 are present preferably of inverted T cross section, except the ends, where at each end a fastening member 85 arises in the form of a strip bent in an inverted U-shape.

The columns are preferably of a square tubular construction having faces 86 parallel to the longitudinal axis of the foot member, an outer face 87 perpendicular thereto.

The bed members have parallel channels 89 and 90 with their open sides facing away from each other, and are joined together, as for example by welding, by means of angles 91 and 92 at intermediate positions and also channel 93 at one end. The other end, as best shown in the exploded part of FIGURE 16, has no cross channel as part of the bed member. Toward each end of the outer side of the channel 93 is affixed preferably by welding, angles 95 and 96 respectively, extending more or less vertical in actual use, and with the open part of the angle facing toward the other angle and away from the end in each case. One wing 98 and 99 respectively of each angle extends straight out parallel with the longitudinal axis of the bed member while the other is against the cross channel 93 in each case.

On the outer face of the outstanding wing of each of the said angles, are lugs 100 and 101, of the kind already discussed earlier in this application, relatively widely spaced apart. In a typical installation involving racks for palletizing storage the space between these two lugs will preferably be about 6⅛ inches. At the other end of the parallel channels of the bed plate are end plates 103 and 104 affixed as by welding across the end of the channel more or less perpendicular to the longitudinal axis of the channel. Each end plate has, one above the other, a pair of locking lugs 106 and 107, likewise corresponding to the locking lug of this invention. These locking lugs are much more closely positioned relative to each other than those at the other end of the bed plate, those on the end plates being in a typical similar installation preferably approximately 2⅜ inches apart. The bed plates are preferably put across between two pairs of columns in position one above the other to give a plurality of tiers.

The columns have in each case a pair of interlocking openings positioned to correspond with a pair of lugs on the bed plates. These interlocking openings correspond to the interlock openings of the present invention. Interlock openings 110 and 111 are on a face of the column parallel to the axis of the foot member with a relatively close spacing corresponding to the relatively close spacing of interlock lugs 106 and 107 on end plates with which they would be required to cooperate. Interlock openings 112 and 113 on the inner one of the perpendicular faces of the column are relatively widely spaced to correspond to the widely spaced lugs on the angles with which they are required to cooperate.

To make the columns interchangeable regardless of position, the interlock openings closely spaced one above another are put on each of two opposite faces. While the widely spaced locking lugs 100 and 101, are as already indicated located on a line more or less perpendicular to the axes of the channels 89 and 90, they are not mounted absolutely perpendicularly thereto but are mounted so that the line forms an angle slightly less than 90 degrees with the axes of the channels, if this angle is measured on the underside. Specifically, I have found that an angle of about 89 degrees is desirable. The end plates 103 and 104 on the opposite ends of the channels are likewise mounted in such manner that the lugs are in fact not precisely one above another but having the same angle of cant in the same direction as does the line between the others so that a plane through the four lugs on the one end will be parallel to a plane through the four lugs on the other. In stating that these are mounted slightly canted from the perpendicular relative to the bed plate, we are talking about the rack in unloaded condition. When the rack is in unloaded condition, the columns are thus all in a slight cant in the direction to the left of FIGURE 16, with the bed plates level. When a full load is put upon the racks, as in use, the resultant deflection of the bed plate at the end where the lugs are farthest apart from each other brings these lugs into true vertical alignment, and causes the columns likewise to assume a vertical position, not only at that end of a given set of columns and bed plates, but also at the other. It is believed that the greater moment involved in the greater spacing between the lugs at the one end has a great deal to do with this phenomenon.

This canting of the vertical position of the lugs 101 and 100 in unloaded position relative to the parallel channels of the bed plate can of course be accomplished in various ways, but the preferred way in which it is done by me is to give a corresponding angle to the outer face 115 of channel 93 and thus give a corresponding angle to the angle 95 mounted thereon and to the lugs mounted on the angle. Likewise, in the case of the corresponding cant for the lugs 106 and 107 at the other end, this can readily be done by giving a corresponding angle to the end of the channel and thus to the face of the end plates 103 and 104.

This canting of the columns in my rack is highly important to the results secured thereby. When a rack of this sort is manufactured with the columns exactly vertical in unloaded position of the bed plates, loading of the bed plates will tend to make the columns cant, i.e. columns 117 at that end cant in the direction of the bed plates to which they are attached by means of the widely spaced lugs, and therefore to make the columns at the other end cant in the same direction. This phenomenon is increased by the unbalanced position relative to load which the column assumes under cant. That is, once the column has canted under load the unbalanced position of the load itself relative to it tends to make it cant more in the same direction. Thus if in unloaded position the columns are without cant, in loaded position a very pronounced cant develops. Thus with a structure which does not have the original counteracting cant in the unloaded condition, the structure under load is in grave danger of failure, and the load-carrying capacity or the life of the structure or both is much less in view of this danger.

The presence of the downwardly extending angle 95 with its widely spaced lugs is important to give stiffness and stability in both perpendicular longitudinal direction of the rack and parallel thereto. Likewise it develops resisting moment to any harm by a truck, as for example a fork lift-truck intended for use with pallets for loading upon the rack.

The greater the distance between the lugs 100 and 101, the greater is this stiffening effect. Preferably, in ordinary construction of the type shown, the more widely spaced lugs 100 and 101 should be at the very minimum at least twice as far apart as the closer lugs at the opposite end 106 and 107.

A rack of the present invention is extremely easy to construct, requiring only the use of a hammer, is quite economical and quite readily adjustable. Despite its excellent stiffness, and stability and the fact there is no excessive depth to the bed members, it provides absolute clearance in all points of entry into the rack space.

Starter 83 is used merely at the one end of the rack structure as a whole, to supply the stability which in the rest of the columns is supplied by the succeeding bed members in each case. It corresponds in structure to channel 93 and angles 95 and 96 of the bed plate detached from the rest of the bed plate. In order that it not interfere with personnel travel past the ends of the rack, it is put in facing the opposite direction relative to the rack from the way in which channel 93 and its angles are facing.

The fact that the bed member has a cross channel at one end and no cross channel at the other is a distinct practical advantage. The channel at the one end, together with the angles, fixes a normal width for the rack structure. The fact that there is no channel at the opposite end means that if for any reason the bed members should have slightly differing widths, as, for example, if they should become somewhat bent in transit, the opposite end has a certain limited amount of flexibility to take care of this situation. This also would permit taking care of slight errors in manufacture, such as punching holes in opposite sides of a tube in slightly different positions.

While FIGURE 18 shows interlocking openings on opposite sides in the case of closely spaced interlocking openings, it is entirely possible to have the interlocking opening on only the one side, and indeed that is the way they are shown in the other figures, in which case the columns will not all be interchangeable, but two types of columns will be employed, with differing relative positions between faces having the two different spacings of holes.

One of the special advantages of the present invention is the way in which the level at which the bed surface is placed can be changed at will merely by utilization of different sets of holes in the columns. Another special advantage is the ease of shipping because the component parts can readily nest in bundles or groups.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fail within the reasonable spirit and scope of my claims.

Having thus described my invention what I claim as new and desire to secure by Letters Patent is:

1. A rack structure intended to hold a load, comprising a series of elongated foot members parallel to each other in spaced position and each having inverted U locking members extending upward near each end thereof, a series of rectangular tubular vertical columns resting on individual foot members with faces parallel and perpendicular to the longitudinal axes of said foot members, each held in position by a different one of the locking members and each having a plurality of pairs of interlocking openings at different levels on corresponding faces of the columns parallel to the longitudinal axis of the foot members and on the inner of the faces of the columns perpendicular to said axis, the individual openings of said pairs being one above another with space between, which space is greater in the case of the pairs on said perpendicular faces than those on said parallel faces, horizontal bed members one above another between the pairs of columns that rise from adjacent foot members and having wedging lugs corresponding in position to the slots on said perpendicular faces at one end and said parallel faces at the other, the columns being canted from the vertical in the no-load position in the direction corresponding to the direction from the end of the bed with said lugs corresponding to slots in parallel faces to the end of the bed with said lugs corresponding to slots in perpendicular faces, and not canted in the full load position.

2. A bed member for use in a readily constructible rack comprising a body structure having a top face in a particular plane, a first pair of locking members mounted on said structure toward a particular side of said structure, said locking members being positioned one above another on a line canted from the perpendicular relative to said plane, and a second pair of locking members mounted on said structure toward the opposite side of said structure, said second pair of locking members being positioned one above the other closer together than the first pair and on a line parallel to the other line and lying in the same vertical plane as said other line.

3. A bed member for use in a readily constructible rack comprising two straight parallel channels, cross connecting structure intermediately and near one end but not near the other end of said channel, an outward projection from said cross connecting structure at a point toward the one end, a first pair of locking lugs extending from said projection in a horizontal direction at right angles to the horizontal axes of said channels, said lugs being located one above another on a line canted from the vertical in a plane parallel to the axes of the channels, an end plate mounted on the other end of a channel, and a second pair of locking lugs mounted on said end plate one above the other and extending in a direction parallel to the channels, the line between said second pair of locking lugs being canted in a direction parallel to that between the first pair, and said first pair of locking lugs being more than twice as far apart as said second pair.

4. In a quick detachable structure, a pair of of parallel spaced elements having female slots on the sides thereof, a connecting element extending in the transverse direction between the aforesaid spaced elements, a quick detachable connection at each end of the connecting element in engagement with one of the spaced elements, one of said connections being at one side of the longitudinal axis of the connecting element and having male connecting members extending transversely toward the said longitudinal axis and engaging the female slots on the adjacent spaced element, and the other of the said quick detachable connections at the other end of the connecting element being on the other side of the said longitudinal axis of the connecting element and having male connecting members extending transversely toward the said longitudinal axis and engaging the female slots on the adjacent spaced element, said male members on said quick detachable connections extending in parallel directions transverse to said longitudinal axis, whereby the connecting element can be detached without changing the relative spacing of the spaced elements.

References Cited in the file of this patent
UNITED STATES PATENTS

| | | |
|---|---|---|
| 983,673 | Boyer | Feb. 7, 1911 |
| 1,473,817 | Gorsline | Nov. 13, 1923 |
| 1,574,563 | Duff | Feb. 23, 1926 |
| 2,589,947 | Magnuson | Mar. 18, 1952 |
| 2,760,650 | Franks | Aug. 28, 1956 |
| 2,765,087 | Weinbaum | Oct. 2, 1956 |
| 2,825,431 | Molt | Mar. 4, 1958 |
| 2,833,421 | Skubic | May 6, 1958 |
| 2,932,409 | Wineman | Apr. 12, 1960 |